US00RE47314E

(19) United States
(12) Reissued Patent
Park et al.

(10) Patent Number: US RE47,314 E
(45) Date of Reissued Patent: Mar. 19, 2019

(54) APPARATUS AND METHOD FOR SELECTING A QOS IN A PORTABLE COMMUNICATION SYSTEM

(71) Applicant: Samsung Electronics Co., Ltd., Suwon-si, Gyeonggi-do (KR)

(72) Inventors: Sung-Ik Park, Hwaseong-si (KR); Woo-Young Choi, Incheon (KR)

(73) Assignee: Samsung Electronics Co., Ltd., Suwon-si (KR)

(21) Appl. No.: 15/094,532

(22) Filed: Apr. 8, 2016

Related U.S. Patent Documents

Reissue of:
(64) Patent No.: 8,966,562
Issued: Feb. 24, 2015
Appl. No.: 12/173,674
Filed: Jul. 15, 2008

(30) Foreign Application Priority Data

Jul. 18, 2007 (KR) ..... 10-2007-0071535

(51) Int. Cl.
*H04L 29/06* (2006.01)
*H04N 7/14* (2006.01)
*H04L 29/08* (2006.01)
*H04M 7/00* (2006.01)

(52) U.S. Cl.
CPC ..... *H04L 65/4084* (2013.01); *H04L 65/1069* (2013.01); *H04L 65/80* (2013.01); *H04L 67/04* (2013.01); *H04L 67/14* (2013.01); *H04M 7/0057* (2013.01); *H04N 7/141* (2013.01); *H04M 2201/50* (2013.01)

(58) Field of Classification Search
CPC ..... H04L 67/04; H04L 65/4084
USPC ..... 348/14.01–14.14
See application file for complete search history.

(56) References Cited

U.S. PATENT DOCUMENTS 5,587,928 A * 12/1996 Jones ..... H04M 3/567 348/14.1
5,862,451 A * 1/1999 Grau ..... H04H 20/42 348/192
6,453,336 B1 * 9/2002 Beyda et al. ..... 709/204
6,750,897 B1 * 6/2004 Moshrefi et al. ..... 348/14.08
(Continued)

FOREIGN PATENT DOCUMENTS

WO 2006/004157 A1 1/2006
WO 20061004157 A1 1/2006
WO 2006/010373 * 2/2006 ..... H04W 76/025

OTHER PUBLICATIONS

IEEE dictionary definition of unit, The Authoritative Dictionary of IEEE Standard terms, seventh edition, 2000.*

*Primary Examiner* — Robert Nasser
(74) *Attorney, Agent, or Firm* — Jefferson IP Law, LLP

(57) ABSTRACT

An apparatus and method for selecting a QoS in a portable communication system are provided. The method includes, when using a high quality video communication service, sending a request for the high quality video communication service to a destination terminal using a Circuit Service Data (CSD) channel, receiving a reply message to the high quality video communication service request and, when the reply message is an acceptance of an execution of the high quality video communication service, disconnecting the CSD channel and then connecting a Packet Service Data (PSD) channel, and providing the high quality video communication service using the PSD channel.

3 Claims, 8 Drawing Sheets

(56) References Cited

U.S. PATENT DOCUMENTS 7,053,923 B1 * 5/2006 Hamilton ..... H04N 7/141 348/14.01
7,719,562 B2 * 5/2010 Liu ..... H04L 12/2854 348/14.01
7,958,532 B2 * 6/2011 Paul et al. ..... 725/90
2001/0048678 A1 * 12/2001 Witchalls ..... H04L 29/06027 370/352
2002/0174434 A1 * 11/2002 Lee et al. ..... 725/74
2003/0061622 A1 * 3/2003 Nebiker et al. ..... 725/117
2003/0122921 A1 * 7/2003 Taib ..... H04M 3/56 348/14.01
2003/0188316 A1 * 10/2003 DePrez ..... 725/87
2003/0196211 A1 * 10/2003 Chan ..... 725/131
2004/0179092 A1 * 9/2004 LaPoint ..... H04L 29/06 348/14.08
2004/0218035 A1 * 11/2004 Crook ..... H04L 29/06027 348/14.02
2004/0246951 A1 * 12/2004 Parker ..... H04L 29/06027 370/356
2005/0025134 A1 * 2/2005 Armistead ..... 370/352
2005/0073574 A1 * 4/2005 Krisbergh ..... H04N 7/147 348/14.01
2005/0107107 A1 * 5/2005 Shahidi et al. ..... 455/522
2005/0286711 A1 * 12/2005 Lee ..... H04L 12/5692 379/399.01
2006/0025149 A1 2/2006 Karaoguz et al.
2006/0121924 A1 * 6/2006 Rengaraju ..... H04N 7/142 455/518
2006/0168612 A1 * 7/2006 Chapman et al. ..... 725/11
2006/0198360 A1 9/2006 Biage et al.
2007/0058645 A1 * 3/2007 Nannra et al. ..... 370/401
2007/0120956 A1 * 5/2007 Watanabe ..... H04N 21/43637 348/14.01
2007/0146476 A1 * 6/2007 Son ..... 348/14.01
2007/0199043 A1 * 8/2007 Morris ..... 725/143
2007/0201435 A1 * 8/2007 Fisher ..... 370/352
2007/0257983 A1 * 11/2007 Miali ..... H04L 29/06027 348/14.11
2008/0024591 A1 * 1/2008 Doi ..... H04W 8/245 348/14.01
2008/0039150 A1 * 2/2008 Lin ..... H04N 7/15 455/566
2008/0240087 A1 * 10/2008 Goodman ..... 370/354
2008/0305826 A1 12/2008 Morita et al.
2008/0309753 A1 * 12/2008 Karnalkar ..... H04N 7/147 348/14.11
2009/0115837 A1 * 5/2009 Moshrefi et al. ..... 348/14.08
2009/0300162 A1 * 12/2009 Demarie et al. ..... 709/224

* cited by examiner

| 401 ORIGINATION INFO | 403 DESTINATION INFO | 405 COMMUNICATION STATE |
|---|---|---|
| 010 111 1111 | 010 000 0000 | REQ (0) |
| | | END (1) |

FIG.4

APPARATUS AND METHOD FOR SELECTING A QOS IN A PORTABLE COMMUNICATION SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application claims the benefit under 35 U.S.C. §119 (a) of a Korean Patent Application filed in the Korean Intellectual Property Office on Jul. 18, 2007 and assigned Serial No. 2007-71535, the entire disclosure of which is hereby incorporated by reference.

BACKGROUND OF THE INVENTION

1. Field of the Invention

The present invention relates to an apparatus and method for selecting a Quality of Service (QoS) in a portable communication system. More particularly, the present invention relates to an apparatus and method for a user of a portable terminal to directly select a Quality of Service (QoS) and use a video telephone service.

2. Description of the Related Art

In recent years, wireless communications technologies have evolved to provide supplementary functions, such as data communication functions, in addition to conventional voice communication functions. Exemplary data communication functions include General Packet Radio Service (GPRS), Code Division Multiple Access (CDMA) Evolution-Data Optimized (EV-DO), CDMA Evolution-Data and Voice (EV-DV), Wideband Code Division Multiple Access (WCDMA) and High-Speed Downlink Packet Access (HSDPA). As a result of the development of data communication functions, a video telephone service is better able to be provided.

The video telephone service requires a caller identifying and signaling means. An exemplary signaling means is a Session Initiation Protocol (SIP).

SIP is an application-layer signaling protocol that specifies a procedure for identifying and locating portable terminals on the Internet and for creating or deleting and modifying multimedia communication sessions between the portable terminals. SIP is based on a request/response control paradigm for creating, modifying, and terminating multimedia service sessions such as Internet conferencing, voice communication, voice mail, event notification and instant messaging. SIP can be used for at least one of Transmission Control Protocol (TCP) and User Datagram Protocol (UDP).

FIG. 1 is a diagram illustrating a conventional portable communication system providing a video communication service.

In FIG. 1, the portable communication system can include an origination portable terminal 100, a video communication server 110, and a destination portable terminal 102. Herein, the portable communication system may further be operable with another H.324M compatible device 114 via a gateway 112.

The portable terminals 100 and 102 supporting the video communication service communicate with each other in compliance with an H.324M protocol using a Circuit Service Data (CSD) channel when performing the video communication service.

The H.324M protocol is a protocol utilized for video communication that is suitable for use with a low bandwidth communications path. That is, the H.324M protocol is used to transmit image data using only a bandwidth of 42 Kbps to 48 Kbps from a total bandwidth of 64 Kbps and uses the remaining bandwidth for a data channel for a voice signal.

In the event that the portable terminals 100 and/or 102 are able to communicate with another H.324M compatible device 114, the portable terminals 100 and/or 102 will not be able to use the video communication service until a communications path is established via the video communication server 110 and gateway 112.

Therefore, there is a drawback that upon initiation of a video communication service over the CSD channel in the portable communication system, a video communication service cannot be provided with a high quality of service because of limited bandwidth.

Also, there is a drawback in that use of the video communication service is limited because the video communication service over the CSD channel can only be provided between users registered to a specific communication service provider.

Thus, there is needed an apparatus and method for providing a high quality video communication service in a portable communication system.

SUMMARY OF THE INVENTION

An aspect of the present invention is to address at least the above-mentioned problems and/or disadvantages and to provide at least the advantages described below. Accordingly, an aspect of the present invention is to provide an apparatus and method configured to support a video communication service enabling QoS selection in a portable communication system.

Another aspect of the present invention is to provide an apparatus and method for enabling QoS selection in a portable terminal and providing a high quality video communication service.

A further aspect of the present invention is to provide an apparatus and method for storing information on a QoS selected by a portable terminal in a video communication server.

The above aspects are achieved by providing an apparatus and method for selecting a QoS in a portable communication system.

According to one aspect of the present invention, a method for providing a video communication service having a selectable Quality of Service (QoS) in a portable terminal is provided. The method includes, when using a high quality video communication service, sending a request for the high quality video communication service to a destination terminal using a Circuit Service Data (CSD) channel, receiving a reply message to the high quality video communication service request and, when the reply message is an acceptance of an execution of the high quality video communication service, disconnecting the CSD channel and then connecting a Packet Service Data (PSD) channel, and providing the high quality video communication service using the PSD channel.

According to another aspect of the present invention, a portable terminal for providing a video communication service having a selectable Quality of Service (QoS) is provided. The terminal includes a memory anti a controller.

The memory stores user information of a terminal sending a request for a high quality video communication service and information on a notification of an execution or non-execution of a video communication of the terminals. The controller sends a request for the high quality video communication service to a destination terminal using a Circuit Service Data (CSD) channel when using a high quality video communication service and then, when receiving a message of a notification of an execution of a high quality video communication service as a reply message to the request, disconnects the CSD channel and then connects a Packet Service Data (PSD) channel to allow the use of the high quality video communication service.

According to a further aspect of the present invention, a video communication server for providing a video communication service having a selectable Quality of Service (QoS) is provided. The server includes a memory and a server controller. The memory stores user information of a portable terminal sending a request for a high quality video communication service and information on a notification of an execution or non-execution of a video communication of the terminals. The server controller stores and updates user information of the portable terminal and information for notifying an execution or non-execution of a high quality video communication of the terminals in the memory when receiving information for requesting a high quality video communication service from the portable terminal, and transmits user information of a destination terminal to each terminal when the terminals perform a high quality video communication.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will become more apparent from the following detailed description taken in conjunction with the accompanying drawings, in which:

FIG. 4 is a diagram illustrating a construction of high quality communication information record according to an exemplary embodiment of the present invention;

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

An apparatus and method for providing a selective Quality of Service (QoS) for a video communication service is described below.

Figure 1:
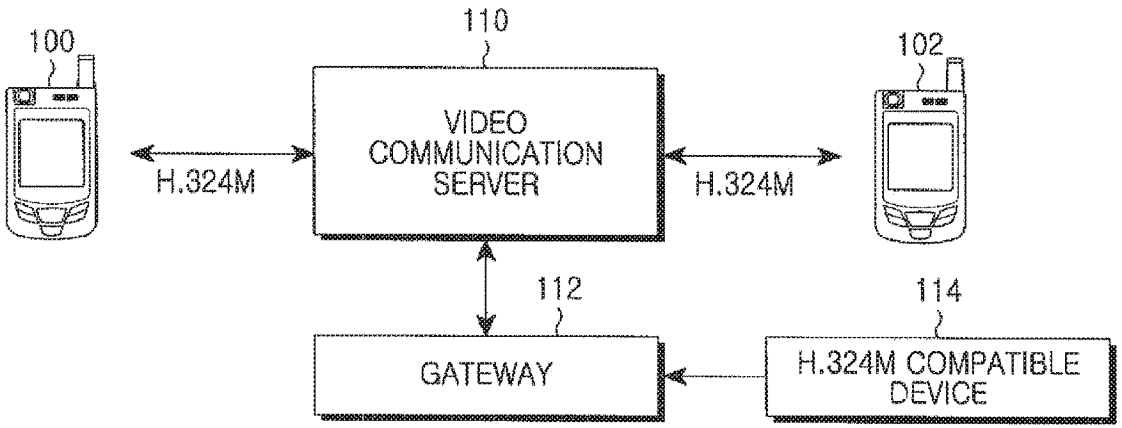
FIG. 1 (CONVENTIONAL ART)
FIG. 1 is a diagram illustrating a conventional portable communication system providing a video communication service.
Figure 2:
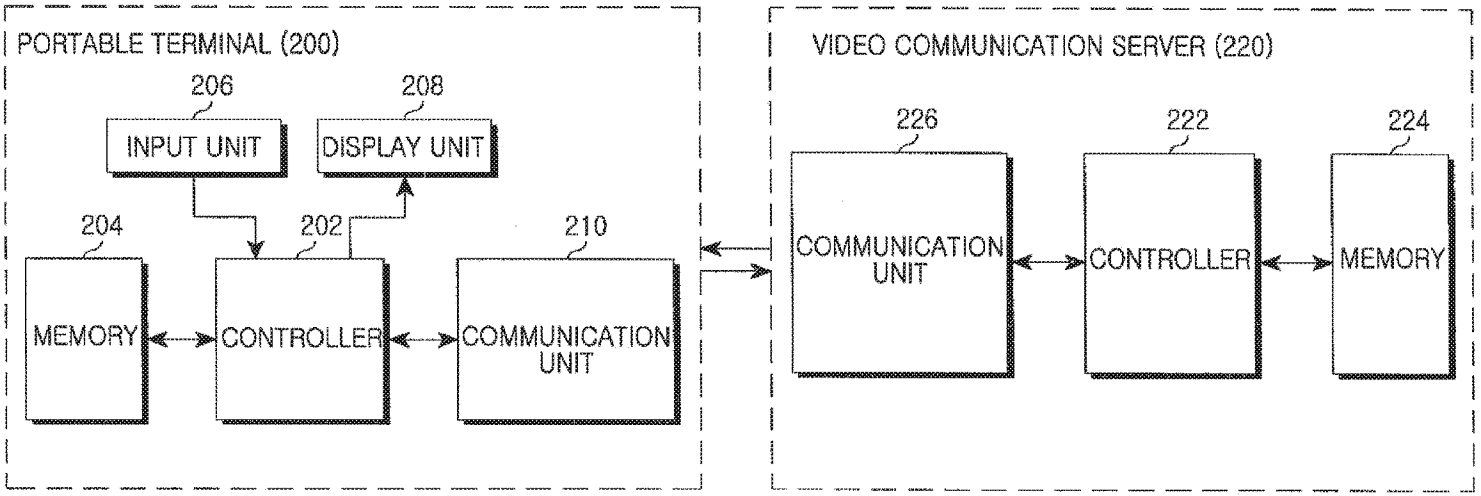
FIG. 2 is a block diagram illustrating a construction of a portable communication system providing a selective QoS according to an exemplary embodiment of the present invention.

FIG. 2 is a block diagram illustrating a construction of a portable communication system providing a selective QoS according to an exemplary embodiment of the present invention.

Referring to FIG. 2, the portable communication system can include a portable terminal 200 and a video communication server 220.

The portable terminal 200 can include a controller 202 (*e.g. a processor*), a memory 204, an input unit 206, a display unit 208 and a communication unit 210. The controller 202 controls a general operation of the portable terminal 200. For example, the controller 202 performs a process for controlling voice and data communications. In addition to a general control function, upon execution of a high quality video communication function, the controller 202 transmits user information to the video communication server 220, updates a high quality communication information record, disconnects a CSD channel, and performs data exchange over the packet service data channel according to exemplary embodiments of the present invention. *The user information includes at least one of a phone number, an Internet Protocol (IP) address, and information on an execution or non-execution of a QoS communication.*

Upon non-execution of the high quality video communication function, the controller 202 transmits user information to the video communication server 220, updates the high quality communication information record and performs data exchange over the CSD channel.

The memory 204 includes a Read Only Memory (ROM), a Random Access Memory (RAM) and a flash ROM. The ROM stores a microcode of a program for processing and controlling the controller 202 and a variety of reference data.

The RAM, a working memory of the controller 202, stores temporary data generated during execution of a variety of programs. The flash ROM stores various updateable data for safekeeping such as a phone book, an outgoing message and an incoming message.

The input unit 206 includes numeral key buttons '0' to '9', a menu button, a cancel button (delete), an OK button, a talk button, an end button, an Internet button, navigation key (or direction key) buttons and a plurality of function keys such as a character input key. The input unit 206 provides key data (e.g., a high quality video communication request) on a key pressed by a user to the controller 202.

The display unit 208 displays status information generated during the execution of the portable terminal 200, a limited number of characters and a large amount of moving and still images. The display unit 110 can be a color or monochrome Liquid Crystal Display (LCD), Organic Light-Emitting Diode (OLED) or any other type of device capable of displaying characters, images or indictors.

The communication unit 210 receives and transmits a wireless data signal through an antenna (not shown). For example, in a transmission mode, the communication unit 214 processes data by channel coding and spreading, converting the processed data into a Radio Frequency (RF) signal, and transmitting the RF signal. In a reception mode, the communication unit 210 converts a received RF signal into a baseband signal, processes the baseband signal by de-spreading and channel decoding, and restores the processed signal into data.

The video communication server 220 can include a server controller 222 (*e.g. a processor*), a memory 224, and a communication unit 226.

The server controller 222 controls the general operation of the video communication server 200. For example, upon execution of a video communication service, the server controller 222 updates the high quality communication information record using user information received from a user of the portable terminal 200 and then stores the updated communication information record in the memory 224.

The communication unit 226 communicates with the portable terminal 200 and receives user information from the portable terminal 200.

The memory 224 of the video communication server 200 stores the high quality communication information record updated by the server controller 222.

The apparatus for providing a selective QoS for video communication has been described above. A method for providing a selective QoS for video communication using the apparatus according to an exemplary embodiment of the present invention is described below.

Figure 3:
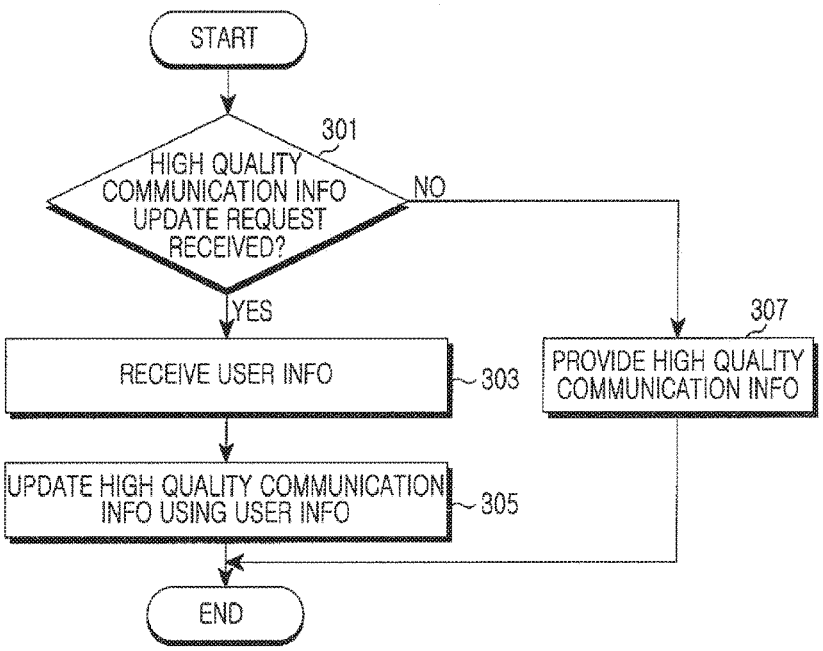
FIG. 3 is a flow diagram illustrating a process of providing a selective QoS in a video communication server according to an exemplary embodiment of the present invention.

FIG. 3 is a flow diagram illustrating a process of providing a selective QoS in the video communication server according to an exemplary embodiment of the present invention. In the description below, FIG. 4 is a diagram illustrating a construction of the high quality communication information record.

Referring to FIG. 3, the video communication server 220 checks whether it receives a request for updating the high quality communication information record from a portable terminal 200 in step 301.

The high quality communication information record update request refers to an event for modifying the high quality communication information record in response to a request for high quality video communication with a destination portable terminal that is sent from an origination portable terminal to the destination portable terminal.

The video communication server 220 receives user information from the origination portable terminal in step 303 when receiving the high quality communication information record update request. After that, the video communication server 220 updates the high quality communication information record stored in the memory 224 of the video communication server 220 using the received user information in step 305.

In particular, the video communication server 220 receives the origination information and updates the high quality communication information record when receiving a request for high quality communication from the origination portable terminal. The video communication server 220 receives destination information and updates the high quality communication information record if a response to the high quality communication request is received from the destination portable terminal.

In other words, as shown in FIG. 4, the video communication server 220 stores the origination information in an origination information field 401 of the high quality communication information record when the origination information is received from the origination portable terminal and stores the destination information in a destination information field 403 when the destination information is received from the destination portable terminal.

The video communication server 220 can set communication state information in a communication state field 405 of the high quality communication information record as "End" if information is received regarding a rejection of the high quality communication request from the destination portable terminal. The video communication server 220 can set the communication state information on the communication state field 405 as "Req" if information is received regarding the acceptance of the high quality communication request.

The video communication server 220 provides the high quality communication information form the high quality communication information record to the destination portable terminal in step 307 if it does not receive the high quality communication information record update request in step 301. In other words, the video communication server 220 provides the high quality communication information from the high quality communication information record to the destination portable terminal in step 307 if a high quality communication information identification request is received from the destination portable terminal for identifying a communication state of the origination portable terminal.

After that, the video communication server 220 terminates the process.

Figure 5:
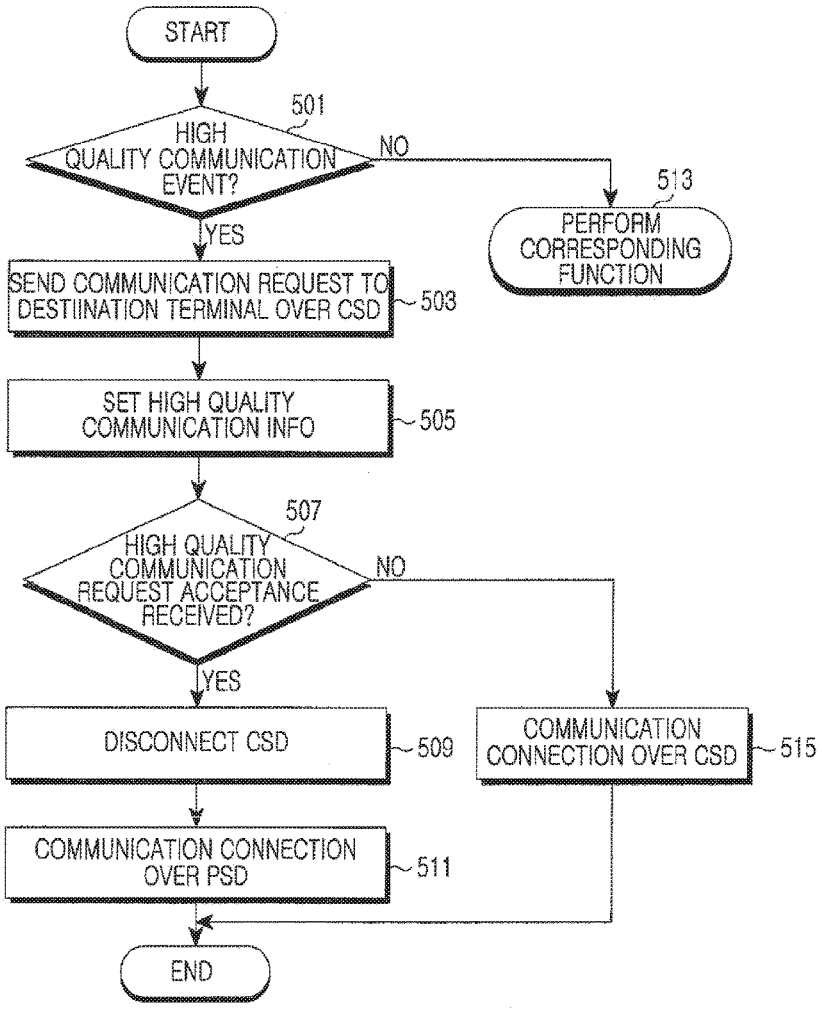
FIG. 5 is a flow diagram illustrating a process of providing a selective QoS in an origination portable terminal according to an exemplary embodiment of the present invention.

FIG. 5 is a flow diagram illustrating a process of providing a selective QoS in an origination portable terminal according to an exemplary embodiment of the present invention.

Referring to FIG. 5, a controller 202 of the origination portable terminal checks whether an event for using a high quality video communication service occurs in step 501.

If the event does not occur, the controller 202 performs a corresponding function (e.g., maintaining an existing video communication service) in step 513.

If the event occurs, the controller 202 sends a request for video communication to a destination portable terminal over a CSD channel in step 503. That is, at the time the event occurs, the controller 202 can communicate with the destination portable terminal over the CSD channel, thereby sending the video communication request.

After that, the controller 202 sets the high quality communication information record of the video communication server 220 in step 505.

In particular, the controller 202 transmits origination information to the video communication server 220 over a Packet Service Data (PSD) channel and sets the origination information field 401 of the high quality communication information record.

After that, the controller 202 checks whether it receives information on an acceptance of the high quality communication request from the destination portable terminal in step 507.

Upon receiving the information on the acceptance of the high quality communication request from the destination portable terminal, the controller 202 disconnects the connected CSD channel of step 503 in step 509 and performs a communication connection over the PSD channel in step 511, thereby using a high quality video communication service.

If information is received regarding a rejection of the high quality communication request, the controller 202 performs a communication connection over the CSD channel in step 515.

After that, the controller 202 terminates the process.

Figure 6:
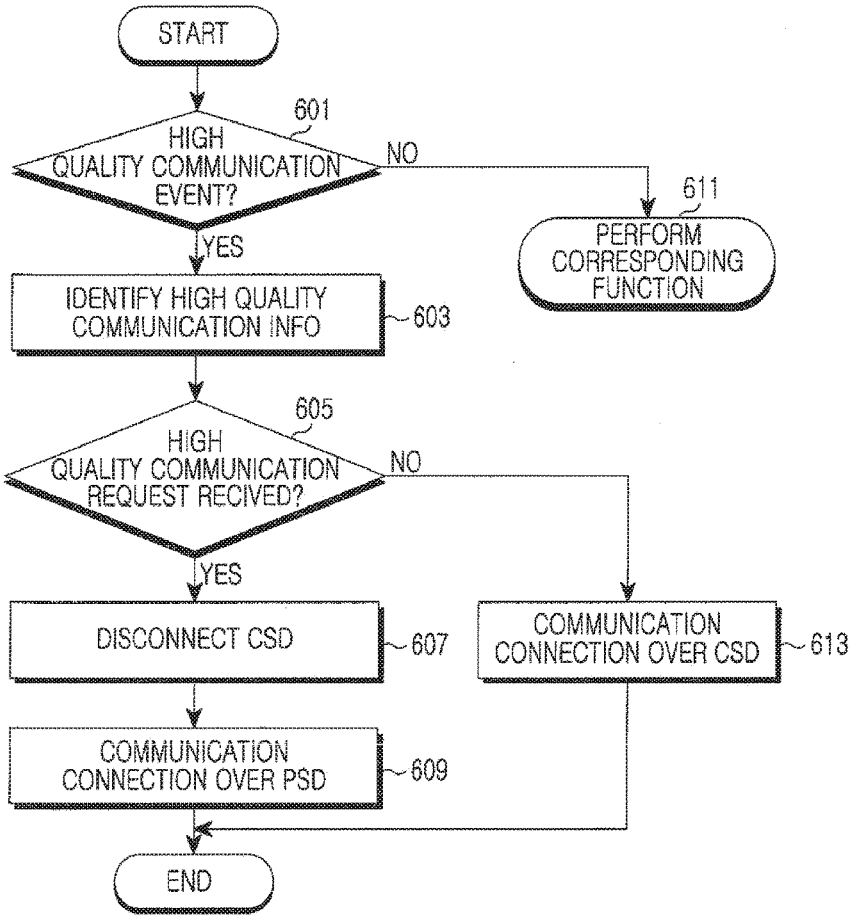
FIG. 6 is a flow diagram illustrating a process of providing a selective QoS in a destination portable terminal according to an exemplary embodiment of the present invention.

FIG. 6 is a flow diagram illustrating a process of providing a selective QoS in a destination portable terminal according to an exemplary embodiment of the present invention.

Referring to FIG. 6, a controller 202 of the destination portable terminal cheeks whether an event for using a high quality video communication service occurs in step 601.

If the event does not occur, the controller 202 performs a corresponding function in step 611.

If the event occurs, the controller 202 identifies the high quality communication information of an origination portable terminal preset at the video communication server 220 in step 603. After that, the controller 202 checks whether the origination portable terminal sends a request for high quality video communication in step 605.

The controller 202 can identity whether the origination portable terminal sends the high quality video communication request, using the communication state information 405 of the high quality communication information record previously stored in the video communication server 220.

If it is identified that the origination portable terminal sent the high quality video communication request, the controller 202 disconnects a connected CSD channel in step 607 and performs a communication connection over a PSD channel in step 609, thereby using a high quality video communication service.

The controller 202 performs a communication connection over the CSD channel in step 613 if it is identified that the origination portable terminal does not send the high quality video communication request.

After that, the controller 202 terminates the process.

Figure 7:
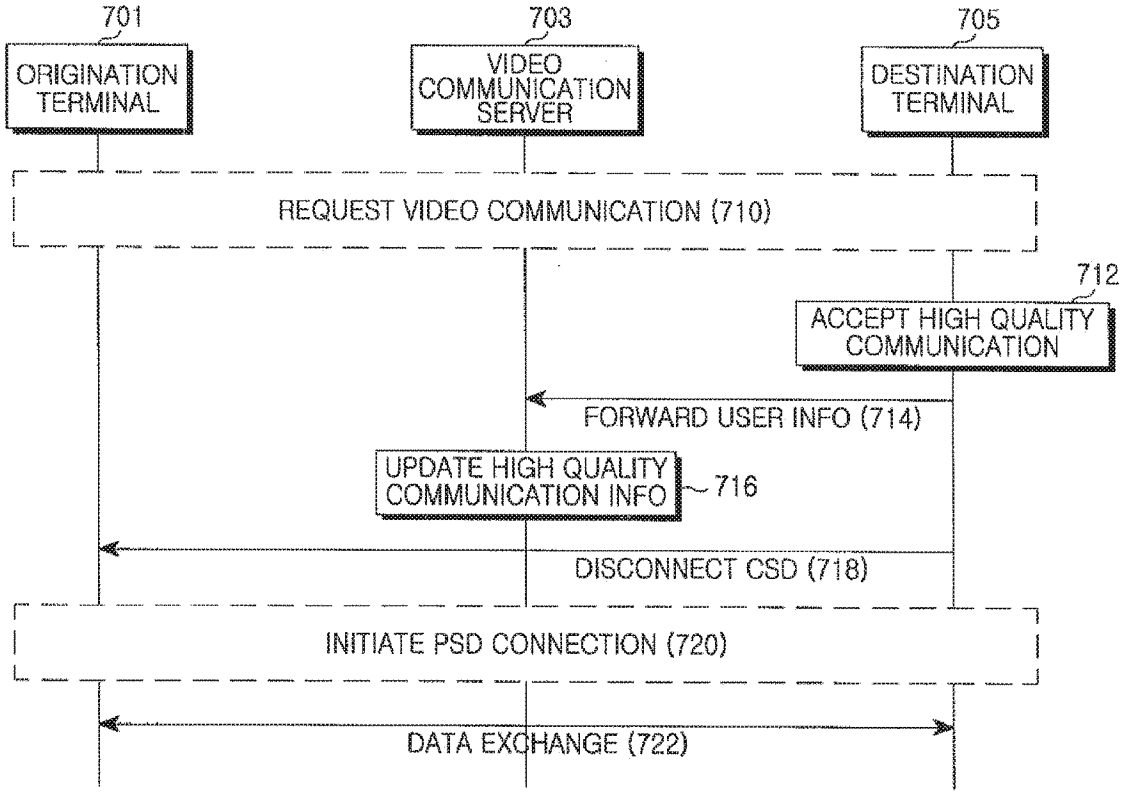
FIG. 7 is a ladder diagram illustrating a process of providing a high quality video communication service with the provision of a selective QoS in a portable communication system according to an exemplary embodiment of the present invention.

FIG. 7 is a ladder diagram illustrating a process of providing a high quality video communication service with the provision of a selective QoS in a portable communication system according to an exemplary embodiment of the present invention.

Referring to FIG. 7, the portable communication system can include an origination portable terminal 701, a video communication server 703, and a destination portable terminal 705.

The origination portable terminal 701 communicates with the destination portable terminal 705 over a CSD channel, thereby sending a video communication request to the destination portable terminal 705 (step 710).

After that, the origination portable terminal 701 connects to the video communication server 703 and stores origination information of the origination portable terminal 701, thereby setting the high quality video communication information record.

The destination portable terminal 705 solicits from its user a selection of the execution of the high quality video communication when receiving a communication for the video communication request from the origination portable terminal 701. Destination portable terminal 705 may solicit from its user the selection of the execution of the high quality video communication in a number if different ways. For example, destination portable terminal 705 may provide a tactile, audible, or visual indication that the user is to make a selection. Alternatively, the destination portable terminal 705 may include and be able make a selection without the user based on a pre-stored selection, when receiving a call for the video communication request from the origination portable terminal 701. The pre-stored selection may vary based on criteria received with the call, information stored in the destination portable terminal 705, or other criteria, such as time and location. The pre-stored selection may be store locally or remote from the destination portable terminal 705.

When detecting an acceptance of the high quality video communication request from the destination portable terminal 705(step 712), the destination portable terminal 705 transmits user information, that is, information on the user of the destination portable terminal 705, to the video communication server 703 (step 714).

Upon receiving the user information, the video communication server 703 stores the user information in a destination information field of the high quality communication information record, thereby updating the high quality communication information record (step 716).

Next, the destination portable terminal 705 forwards a request for disconnecting the CID channel to the origination portable terminal 701 (step 718). Upon receiving the request, the origination portable terminal 701 initiates a service connection with the destination portable terminal 705 over a PSD channel (step 720).

The origination portable terminal 701 then initiates data exchange with the destination portable terminal using an SIP (step 722).

Figure 8:
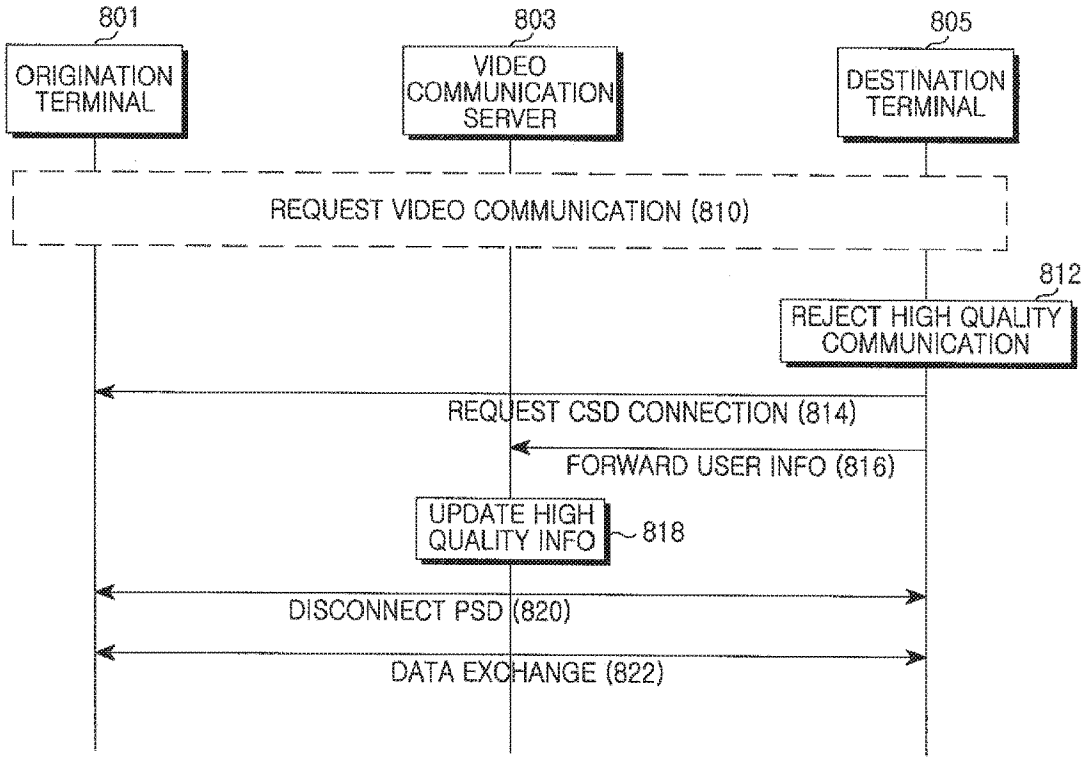
FIG. 8 is a ladder diagram illustrating a process of providing a general quality video communication service with the provision of a selective QoS in a portable communication system according to an exemplary embodiment of the present invention.

FIG. 8 is a ladder diagram illustrating a process of providing a general quality video communication service with the provision of a selective QoS in a portable communication system according to an exemplary embodiment of the present invention.

Referring to FIG. 8, the portable communication system can include an origination portable terminal 801, a video communication server 803, and a destination portable terminal 805.

The origination portable terminal 801 calls the destination portable terminal 805 over a CSD channel, thereby sending a video communication request to the destination portable terminal 805 (step 810).

After that, the origination portable terminal 801 communicates with the video communication server 803 and stores origination information of the origination portable terminal 801, thereby setting the high quality video communication information record. *The origination information includes at least one of a phone number, an IP address, and information on an execution or non-execution of a QoS communication.*

The destination portable terminal 805 solicits from its user a selection for the execution of the high quality video communication when receiving a call for the video communication request from the origination portable terminal 801. Destination portable terminal 805 may solicit from its user the selection of the execution of the high quality video communication in a number if different ways. For example, destination portable terminal 805 may provide a tactile, audible, or visual indication that the user is to make a selection. Alternatively, the destination portable terminal 805 may include and be able make a selection without the user based on a pre-stored selection, when receiving a call for the video communication request from the origination portable terminal 801. The pre-stored selection may vary based on criteria received with the call, information stored in the destination portable terminal 805, or other criteria, such as time and location. The pre-stored selection may be store locally or remote from the destination portable terminal 805.

When detecting an rejection of the high quality video communication request from the destination portable terminal 805 (step 812), the destination portable terminal 805 sends a request for connecting a CSD channel to the origination portable terminal 801 (step 814). After that, the destination portable terminal 805 transmits user information, that is, information on the user of the destination portable terminal 805 to the video communication server 803 (step 816).

Upon receiving the user information, the video communication server 803 stores the user information in a destination information field of the high quality communication information record and sets a communication state field of the high quality communication information record as "End", thereby updating the high quality communication information record (step 818).

Upon receiving the CSD connection request, the origination portable terminal 801 disconnects a PSD channel connected with the destination portable terminal 805 (step 820) and then performs data exchange over the CSD channel (step 822).

In other words, the origination portable terminal 701 initiates a data exchange over the CSD channel using the H.324M protocol.

As described above, a selective QoS in a portable communication system according to exemplary embodiments of the present invention can be a solution to a lack of QoS caused by limited bandwidth in an existing portable communication system and provides a high quality video communication service, thereby providing an alternative to poor quality video communication services.

Alternate embodiments of the present invention can also comprise computer readable codes on a computer readable medium. The computer readable medium includes any data storage device that can store data that can be read by a computer system. Examples of a computer readable medium include magnetic storage media (such as ROM, floppy disks, and hard disks, among others), optical recording media (such as CD-ROMs or DVDs), and storage mechanisms such as carrier waves (such as transmission through the Internet). The computer readable medium can also be distributed over network coupled computer systems so that the computer readable code is stored and executed in a distributed fashion. Also, functional programs, codes, and code segments for accomplishing the present invention can be construed by programmers of ordinary skill in the art to which the present invention pertains While the invention has been shown and described with reference to certain preferred embodiments thereof, it will be understood by those skilled in the art that various changes in form and details may be made therein without departing from the spirit and scope of the invention as defined by the appended claims and their equivalents.

What is claimed is:

[1. A method for providing a video communication service having a selectable Quality of Service (QoS) in a portable terminal, the method comprising:

sending a request for the high quality video communication service to a destination terminal using a Circuit Service Data (CSD) channel;

receiving a reply message to the high quality video communication service request and, when the reply message is an acceptance of an execution of the high quality video communication service, providing the high quality video communication service using Packet Service Data (PSD) channel; and when the reply message is a rejection of an execution of the high quality video communication service, performing a video communication using the CSD channel, wherein sending the high quality video communication service request to the destination terminal further comprises:

transmitting information of a terminal sending a high quality video communication service request, to a video communication server; and transmitting, by the video communication server, a high quality video communication service request message to the destination terminal, and wherein the information of the terminal sending the high quality video communication service request comprises at least one of a phone number, an Internet Protocol (IP), and information on an execution or non-execution of a QoS communication.]

[2. The method of claim 1, wherein, upon receiving the high quality video communication service request message from the video communication server, the destination terminal outputs the request message and then identifies if the high quality video communication service is executed by a user.]

[3. The method of claim 2, wherein, upon receiving the high quality video communication service request message from the video communication server, the destination terminal transmits information of the destination terminal to the video communication server when identifying that a notification of an execution of the high quality video communication service is input from the user.]

[4. A portable terminal for providing a video communication service having a selectable Quality of Service (QoS), the terminal comprising:

a memory for storing user information of a terminal sending a request for a high quality video communication service and information on a notification of an execution or non-execution of a video communication of the terminals; and a controller for sending a request for the high quality video communication service to a destination terminal using a Circuit Service Data (CSD) channel and then, when receiving a message of a notification of an execution of a high quality video communication service as a reply message to the request, providing the high quality video communication service using a Packet Service Data (PSD), and for, when receiving a notification of a rejection of a high quality video communication service as a reply message to the request, performing a video communication using the CSD channel, wherein the controller transmits information of the terminal sending the request for the high quality video communication service, to a video communication server, and requests the destination terminal to provide the high quality video communication service, and wherein the information of the terminal sending the high quality video communication service request comprises at least one of a phone number, an Internet Protocol (IP), and information on an execution or non-execution of a QoS communication.]

[5. The terminal of claim 4, wherein, upon receiving the high quality video communication service request message from the video communication server, the destination terminal outputs the request message and then identifies if the high quality video communication service is executed by a user.]

[6. The terminal of claim 5, wherein, upon receiving the high quality video communication service request message from the video communication server, the destination terminal transmits information of the destination terminal to the video communication server when identifying that a notification of an execution of the high quality video communication service is input from the user.]

[7. A video communication server for providing a video communication service having a selectable Quality of Service (QoS), the server comprising:

a memory for storing user information of a portable terminal sending a request for a high quality video communication service via a Circuit Service Data (CSD) channel and information on a notification of an execution or non-execution of a video communication of the terminals; and a server controller for, when receiving information for requesting a high quality video communication service from the portable terminal, storing and updating user information of the portable terminal and information for notifying an execution or non-execution of a high quality video communication of the terminals in the memory, and transmitting user information of a destination terminal to each terminal when the terminals perform a high quality video communication via a Packet Service Data (PSD) channel, wherein the information of the portable terminal sending the high quality video communication service request comprises at least one of a phone number, an Internet Protocol (IP), and information on an execution or non-execution of a QoS communication.]

[8. A method for providing a video communication service having a selectable Quality of Service (QoS) in a portable communication system, the method comprising:

disconnecting a connected Circuit Service Data (CSD) channel and establishing a communication connection over a Packet Service Data (PSD) channel, when receiving a high quality communication request from a destination terminal; and receiving user information and information on an execution or non-execution of video communication of at least one of the origination and destination terminal from at least one of the origination and destination terminal and updating a high quality communication information record to reflect the received user information and information on execution or non-execution of video communication, when receiving a high quality communication information request from the at least one of the origination and destination terminal;

transmitting a high quality video communication service request message to the destination terminal, and wherein the information of the terminal sending the high quality video communication service request comprises at least one of a phone number, an Internet Protocol (IP), and information on an execution or non-execution of a QoS communication.]

[9. A non-transitory computer-readable recording medium having recorded thereon a program providing a video communication service having a selectable Quality of Service (QoS) in a portable communication system, comprising:

a first segment, for disconnecting a connected Circuit Service Data (CSD) channel and establishing a communication connection over a Packet Service Data (PSD) channel, when receiving a high quality communication request from a destination terminal; and a second segment, for receiving user information and information on an execution or non-execution of video communication of at least one of the origination and destination terminal from at least one of the origination and destination terminal and updating a high quality communication information record to reflect the user information and the information on execution or non-execution of video communication, when receiving a high quality communication information request from the at least one of the origination and destination terminal; and a third segment for transmitting a high quality video communication service request message to the destination terminal, wherein the information of the terminal sending the high quality video communication service request comprises at least one of a phone number, an Internet Protocol (IP), and information on an execution or non-execution of a QoS communication.]

*10. A method in a portable terminal, the method comprising:*

*transmitting, via a first channel, a request for a video communication service using a second channel to a destination terminal;*

*transmitting information of the portable terminal to a communication server via the second channel, the information of the portable terminal being transmitted to the destination terminal before establishing the second channel between the portable terminal and the destination terminal;*

*receiving a reply message to the request from the destination terminal;*

*when the reply message indicates an acceptance of an execution of the video communication service, providing the video communication service using the second channel; and*

*when the reply message indicates a rejection of the execution of the video communication service, providing the video communication service using the first channel,*

*wherein the information of the portable terminal comprises at least one of a phone number, an Internet Protocol (IP) address, or information on an execution or non-execution of a Quality of Service (QoS) communication, and*

*wherein the second channel comprises a channel for a high speed video communication service faster than the video communication service using the first channel.*

*11. A portable terminal comprising:*

*a communication circuitry; and*

*a processor configured to:*

*control the communication circuitry to transmit, via a first channel, a request for a video communication service using a second channel to a destination terminal;*

*control the communication circuitry to transmit information of the portable terminal to a communication server via the second channel, the information of the portable terminal being transmitted to the destination terminal before establishing the second channel between the portable terminal and the destination terminal;*

*receive, via the communication circuitry, a reply message to the request from the destination terminal,*

*when the reply message indicates an acceptance of an execution of the video communication service, control the communication circuitry to provide the video communication service using the second channel, and*

*when the reply message indicates a rejection of the execution of the video communication service, control the communication circuitry to provide the video communication service using the first channel,*

*wherein the information of the portable terminal comprises at least one of a phone number, an Internet Protocol (IP) address, or information on an execution or non-execution of a Quality of Service (QoS) communication, and*

*wherein the second channel comprises a channel for a high speed video communication service faster than the video communication service using the first channel.*

*12. A portable terminal comprising:*

*a communication circuitry; and*

*a processor configured to:*

*when a request for a video communication service using a first channel is received via a second channel from an originating terminal, identify, via the communication circuitry, information of the originating terminal from a communication server, the information of the originating terminal being received by the portable terminal before establishing the second channel between the portable terminal and the originating terminal,*

*control the communication circuitry to transmit a reply message for the request to the originating terminal based on the information of the originating terminal,*

*when the reply message indicates an acceptance of an execution of the video communication service, control the communication circuitry to provide the video communication service using the first channel, and*

*when the reply message indicates a rejection of the execution of the video communication service, control the communication circuitry to provide the video communication service using the second channel,*

*wherein the information of the originating terminal comprises at least one of a phone number, an Internet Protocol (IP) address, or information on an execution or non-execution of a Quality of Service (QoS) communication, and*

*wherein the second channel comprises a channel for a high speed video communication service faster than the video communication service using the first channel.*

* * * * *